United States Patent [19]

Swetnam

[11] Patent Number: 4,541,538

[45] Date of Patent: Sep. 17, 1985

[54] WIRING DEVICE COVERS

[75] Inventor: Norman T. Swetnam, East Greenwich, R.I.

[73] Assignee: General Electric Company, Schenectady, N.Y.

[21] Appl. No.: 600,741

[22] Filed: Apr. 16, 1984

[51] Int. Cl.[4] .......................... H02G 3/14; H05K 5/03
[52] U.S. Cl. ....................................... 220/3.8; 174/67;
    220/3.2; 220/306
[58] Field of Search ................. 220/3.2, 3.8, 306, 241,
    220/242, 4 B, 4 E; 174/66, 65 R, 67

[56] References Cited

U.S. PATENT DOCUMENTS

| 2,489,245 | 11/1949 | Sola | 220/3.2 |
|---|---|---|---|
| 2,503,876 | 4/1950 | Krauss | 220/306 X |
| 2,510,745 | 6/1950 | Kilsore | 174/67 |
| 2,576,708 | 11/1951 | Williamson | 220/306 |
| 2,866,940 | 12/1958 | Lamb | 220/306 X |
| 3,106,602 | 10/1963 | Hartz . | |
| 3,126,444 | 3/1964 | Taylor | 220/306 X |
| 3,167,372 | 1/1965 | Lawson . | |
| 3,212,038 | 12/1965 | Herrick . | |
| 3,317,073 | 5/1967 | Woerner | 220/4 B |
| 3,491,327 | 1/1970 | Tait et al. . | |
| 3,499,102 | 3/1970 | Gillemot et al. . | |
| 3,650,378 | 3/1972 | Kakuichi | 206/387 |

FOREIGN PATENT DOCUMENTS

| 1107084 | 12/1955 | France | 220/306 |
|---|---|---|---|
| 2315453 | 1/1977 | France | 220/4 B |

Primary Examiner—Allan N. Shoap
Attorney, Agent, or Firm—Nathan D. Herkamp; Philip L. Schlamp; Fred Jacob

[57] ABSTRACT

A hollow snap-on cover for an electrical device is made of a pliable material with detents projecting its from side walls for fastening onto the electrical device without interfering with other device components and without requiring separate cover fasteners.

2 Claims, 1 Drawing Figure

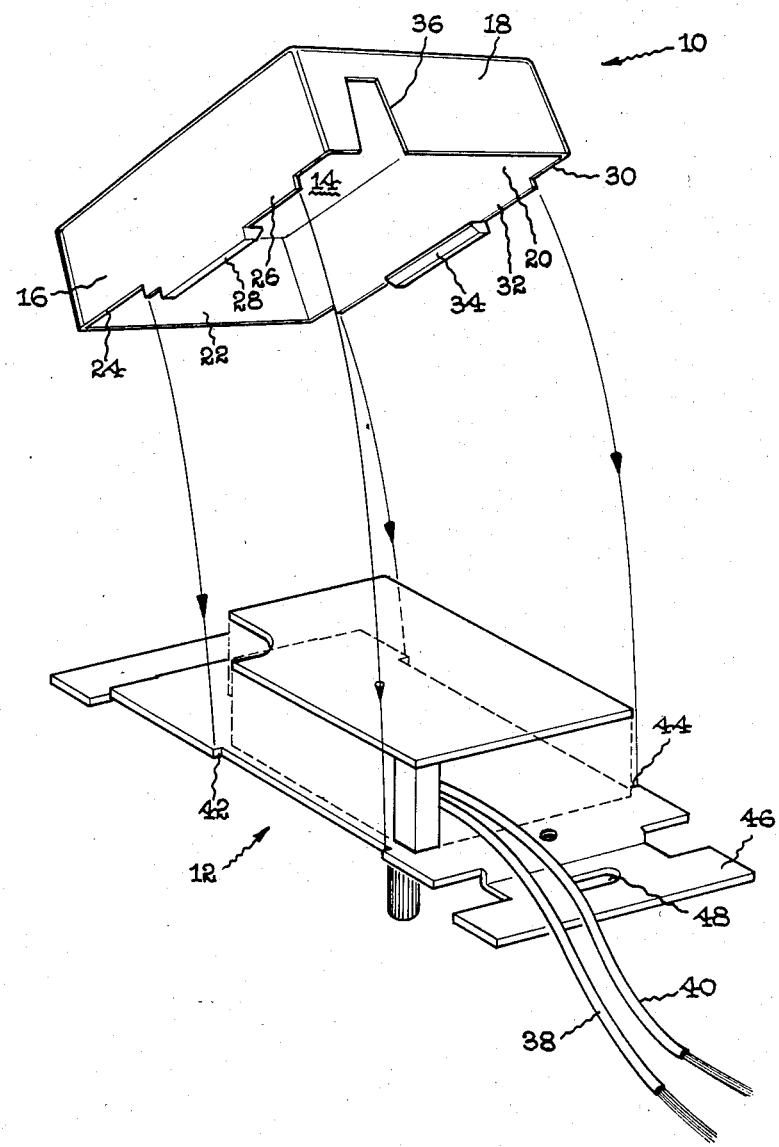

ly rectangular hollow cover with a pair of projections for extending into notches in the faceplate of a wiring device and detents for securing the cover to the plate of the device.

WIRING DEVICE COVERS

BACKGROUND OF THE INVENTION

1. Field of the Invention

This invention relates to protective housings for electrical wiring devices, and, more particularly, to a snap-on wiring device cover for protecting electrical and mechanical components of such devices.

2. Description of the Prior Art

Good trade practice, as well as the Underwriters Laboratories, Canadian Standards Association and other safety Standards require that intricate electrical and mechanical components of wiring devices have sufficient protection from external influences. Such protection includes physical separation from the building wire when a wiring device is installed in a wall box, protection of the mechanism from entrance of dust or similar foreign materials and protection from abuse or misuse in handling, shipping and during installation.

For wall mounted wiring devices, such as dimmers, motor controls, timers, switches, etc., the device assembly typically consists of a mechanism mounted to a plate for attachment to a switch box. In order to protect the components and the mechanism of the device from dust or dirt contamination or mechanical abuse, a cover of suitable material is fastened over the device components and to the plate. Conventionally, the cover was fastened to the plate with rivets, screws or heat staked projections on the cover. The riveted connection was a single use type, so that if the cover were removed from the plate, the fastener would be destroyed. With the screw type of fastener, the fit of the screw in the tapped hole would become less secure and the lesser screw thread engagement would cause the fastening to be inadequate. Removal of a cover employing the heat staked tabs destroyed the tabs and rendered the cover useless. In standard installations, a wall plate is fastened over the front plate of the wiring device to provide electrical insulation and a more pleasing appearance. Standard wall plates often have stiffening ribs running horizontally and/or vertically on the back side of the plate. Any fastening mechanism which protrudes beyond the front plate of the bracket mounting surface can interfere with the wall plate ribs. Also, as a wall plate is fastened over the wiring device, the ribs on the wall plate exert force on the snaps which tend to push the cover from the bracket. Any part of the fastening mechanism holding the wiring device cover to the bracket mounting surface which projects beyond the mounting surface can interfere with the placement of the wall plate and is, therefore, unsatisfactory. Furthermore, the requirement for separate fastening devices for the covers adds to the cost of assembly and installation as well as the speed of assembly of the wiring devices.

SUMMARY OF THE INVENTION

An object of the present invention is to provide a reusable snap-on cover for wiring devices which facilitates assembly and protects the device components.

Accordingly, the present invention comprises a generally rectangular hollow cover with a pair of projections for extending into notches in the faceplate of a wiring device and detents for securing the cover to the plate of the device.

BRIEF DESCRIPTION OF THE DRAWINGS

Further objects and advantages of the present invention together with its organization, method of operation and the best mode contemplated may best be understood by reference to the following description taken in conjunction with the accompanying drawing, in which:

The single FIGURE is a schematic pictorial view illustrating the wiring device cover of the present invention.

DESCRIPTION OF THE PREFERRED EMBODIMENTS

The cover 10 and wiring device 12 of the present invention are shown schematically in the FIGURE. The cover 10 includes a generally flat rectangular member 14 and wall members 16, 18, 20 and 22 forming a generally rectangular perimeter attached to the edge of the flat rectangular member 14. Extending from the edge 24 of the wall member 16 is a projection 26 having detent 28 attached thereto. Attached to the edge 30 of wall member 20 is a projection 32 having detent 34 attached thereto. The detents 28 and 34 comprise protrusions which extend substantially perpendicularly from the respective projections 26 and 32. A notch 36 is cut in wall 18 to accommodate the passage of wires 38, 40 from the wiring device to building wiring. The projections 26 and 32 are of predetermined length to engage respectively slots 42 and 44 of the bracket 46. The wiring device mechanism is attached to the bracket 46, and is not the subject of the present invention. The bracket 46 includes holes 48 at either end thereof for attachment to a switch box in conventional fashion. The length of notch 42 and projection 26 is made substantially shorter than the length of projection 32 and notch 44 in order to prevent reversing the cover during installation.

The cover 10 is made of pliable material, such as flame-retardant polypropylene, so that it may be readily expanded to allow passage of the detents 28, 34 over the edges of the notches 42 and 44 during attachment of the cover 10 to the wiring device 12. The projections facilitate self-alignment of the cover to the bracket and help the cover resist removal under torsion forces applied between the bracket and the cover. The thickness of the detents is selected so that no interference occurs between the detents and standard wall plates, even those having stiffening ribs located generally in the position of the detents. The detents are designed to come within the interference level, so that no problems of interference between the wall plate and the detents on the outside of the bracket will occur. The material of the cover is selected so that it can overcome fatigue problems brought on by several removal and installation steps during assembly of the wiring device. This greatly reduces rejection of the final product due to fatigue of the device cover 10. The present cover protects the circuitry of the device from dust and dirt contamination and also from mechanical abuse and is easily installed and removed for the individual steps required for assembly. Therefore, those skilled in the art will readily appreciate that the present invention provides an improved wiring device cover which meets the needs of manufacturing as well as those of installation and service.

What I claim as new and desire to secure by Letters Patent of the United States is:

1. A snap-on cover for an electrical wiring device having a plate associated therewith comprising:
   a substantially rectangular hollow member of a pliable material and comprising a substantially planar rectangular member and a rectangular wall member surrounding the perimeter of and extending substantially perpendicularly to said planar rectangular member; and
   first and second plate engaging means attached respectively to opposed sides of said rectangular wall member and comprising:
   first and second projections extending respectively from the edge of respective ones of said opposed sides of said wall and in the plane thereof; said first one of said projections comprising a first length and said second one of said projections comprising a second length different from said first length to a degree as to facilitate and ensure proper orientation of said cover to the plate having notches corresponding in lengths to said projections; and
   first and second detents connected to respective ones of said first and second projections and extending substantially perpendicularly thereto.

2. The invention of claim 1 further comprising:
   a notch in one side of said wall member and comprising a cutout extending from the edge of said wall member toward said planar rectangular member.

* * * * *